United States Patent
Fries et al.

(10) Patent No.: US 10,286,841 B2
(45) Date of Patent: May 14, 2019

(54) LIGHT GUIDE WITH OPAQUE LIGHT COVER APPLIED BY INJECTION MOLDING

(71) Applicant: ILLINOIS TOOL WORKS INC., Glenview, IL (US)

(72) Inventors: Elmar Fries, Buchenweg (DE); Heiko Lüders, Am Hündlein (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/573,664

(22) PCT Filed: May 11, 2016

(86) PCT No.: PCT/US2016/031732
§ 371 (c)(1),
(2) Date: Nov. 13, 2017

(87) PCT Pub. No.: WO2016/186911
PCT Pub. Date: Nov. 24, 2016

(65) Prior Publication Data
US 2018/0065548 A1    Mar. 8, 2018

(30) Foreign Application Priority Data
May 19, 2015   (EP) .................................... 15168202

(51) Int. Cl.
*B60Q 3/64* (2017.01)
*G02B 6/00* (2006.01)
(Continued)

(52) U.S. Cl.
CPC ................ *B60Q 3/64* (2017.02); *B29C 45/03* (2013.01); *B29C 45/16* (2013.01); *B60Q 3/217* (2017.02);
(Continued)

(58) Field of Classification Search
CPC ... B60Q 3/62; B60Q 3/64; B60Q 3/66; B60Q 3/68; F21S 43/247; F21S 43/236
See application file for complete search history.

(56) References Cited

U.S. PATENT DOCUMENTS 5,772,304 A       6/1998 Smith
6,499,868 B1 * 12/2002 Kerul, Jr. ............... B60J 3/0282
                                                                 362/492

(Continued)

FOREIGN PATENT DOCUMENTS

CN           2756950       2/2006
CN         104111492      10/2014
(Continued)

OTHER PUBLICATIONS

PCT, International Search Report and Written Opinion, International Application No. PCT/US2016/031732; dated Oct. 7, 2016, 15 pages.

*Primary Examiner* — Robert J May
(74) *Attorney, Agent, or Firm* — Thompson Hine LLP

(57) ABSTRACT

A light guide (1) for a motor vehicle, wherein the light guide (1) has a light-guiding body (10) made of transparent plastics material, wherein the light-guiding body (10) has at least one light-entrance surface (11) and at least one light-exit surface (12) and wherein the light-guiding body (10) is covered in a region by means of a substantially light-opaque cover material (20), wherein the cover material (20) is applied onto the region by means of an injection molding method. The use of such a light guide (1) in a motor vehicle and a method for producing such a light guide (1).

7 Claims, 1 Drawing Sheet

(51) Int. Cl.
  *B60Q 3/217* (2017.01)
  *F21S 43/242* (2018.01)
  *F21S 43/236* (2018.01)
  *B29C 45/03* (2006.01)
  *B29C 45/16* (2006.01)

(52) U.S. Cl.
  CPC .......... *F21S 43/236* (2018.01); *F21S 43/242* (2018.01); *G02B 6/00* (2013.01)

(56) References Cited

U.S. PATENT DOCUMENTS

| | | | |
|---|---|---|---|
| 9,254,785 B2 * | 2/2016 | Sohizad | G02B 6/001 |
| 9,484,165 B2 * | 11/2016 | Chiba | B29C 45/16 |
| 10,059,259 B2 * | 8/2018 | Cannon | B60Q 3/54 |
| 2010/0277938 A1 | 11/2010 | Smith | |
| 2015/0092433 A1 | 4/2015 | Gloss | |
| 2016/0334558 A1 * | 11/2016 | Thomas | G02B 6/001 |

FOREIGN PATENT DOCUMENTS

| | | |
|---|---|---|
| EP | 1010555 | 6/2000 |
| EP | 1760231 | 3/2007 |
| JP | 2001100671 | 4/2001 |

* cited by examiner

LIGHT GUIDE WITH OPAQUE LIGHT COVER APPLIED BY INJECTION MOLDING

The invention relates to light guides for motor vehicles, in particular for decorative purposes and/or for the purposes of illuminating the interior or, for example illuminating the door sill of the motor vehicle.

In the prior art, there are such light guides, which, after installation, are covered by a cover material, e.g. adhesive tape/self-adhesive felt, at those locations at which no light (scattered light) is intended to emerge. The inventors found the prior art to be disadvantageous to the extent that this leads to complicated assembly work and, depending on the applied cover, an insufficient light seal.

It is an object of the present invention to improve the disadvantages of the prior art. This object is achieved by the independent claims. Advantageous developments are defined in the dependent claims.

In particular, the object is achieved by a light guide for a motor vehicle, wherein the light guide has a light-guiding body made of transparent plastics material, wherein the light-guiding body has at least one light-entrance surface and at least one light-exit surface and wherein the light-guiding body is covered in a region by means of a substantially light-opaque cover material, wherein the cover material is applied onto the region by means of an injection molding method.

Furthermore, the object is achieved, in particular, by the use of a light guide according to the invention in a motor vehicle, preferably in an interior trim, particularly preferably in a door inner trim of the motor vehicle, and it is also achieved, in particular, by a motor vehicle door with a door inner trim, that has a light guide according to the invention, and by a door actuation module for a motor vehicle comprising a light guide according to the invention. Preferably, the invention also relates to a motor vehicle door with such a door actuation module, preferably an inner door actuation module.

Furthermore, the object is achieved, in particular, by a method for producing a light guide for a motor vehicle, comprising at least the following steps:
producing a light-guiding body from transparent plastics material, wherein provision is made of at least one light-entrance surface and at least one light-exit surface;
covering a region of the light-guiding body by means of a substantially opaque cover material, wherein the covering is carried out by means of an injection molding method.

As a result of this, a very precise light seal is obtained and it is possible to obtain very different emission geometries or shadowing geometries since large flexibility is provided for the design on account of the injection molding of the cover material, which is not possible in the case of e.g. covering felts or covering tapes. Moreover, the method is less complex in terms of assembly since the light-guiding element already has the desired emission behavior. The slightly more complex production of the light guide is of no consequence due to the easily automatable injection molding methods. Nor is it necessary to provide extra components for the cover, which also saves costs. Finally, the component requires less installation space compared to previous cover solutions due to the tailor-made cover.

A transparent plastics material is preferably understood to mean a material with a degree of transmission of more than 50%, particularly preferably of more than 70%, very particularly preferably of more than 90%. Preferably, the material is achromatic and preferably clear. The light-guiding body preferably has an integral embodiment.

A light-entrance surface is preferably understood to mean a surface of the light-guiding body by means of which, in the installed state of the light-guiding element, light from a light source, preferably an active light source (e.g. an LED of the vehicle), is deliberately coupled into the light-guiding body.

A light-exit surface is preferably understood to mean a surface of the light-guiding body by means of which, in the installed state, light is deliberately decoupled from the light-guiding body, preferably in such a way that an illumination of the vehicle interior or of an element in the vehicle interior is brought about (directly or indirectly) by way of the light. Particularly preferably, the light-exit surface is a visible surface, i.e. a surface which is visible to a vehicle driver during normal use of the vehicle and the functions thereof (i.e. without destroying the vehicle and without removing stops).

A substantially light-opaque cover material is preferably understood to mean a material with a degree of transmission (at the layer thickness employed in each case) of less than 50%, preferably less than 30%, particularly preferably less than 10%. The cover material is preferably dark or black, as a result of which a particularly effective light absorption and hence stray light minimization is carried out. The material is particularly preferably bright or white, as a result of which the light can propagate more efficiently within the light-guiding body to the available light-exit surfaces. Here, the layer thickness is preferably so high that unwanted stray light is weak enough. Very particularly preferably, the cover material has a bright or white inner layer and a dark or black outer layer, as a result of which very good stray light shielding is obtained in the case of an efficient light use and, overall, a thin layer thickness of the two cover material layers. Here, the two layers are preferably applied using the multi-component injection molding method.

In addition to white, the following colors according to the Pantone® color system, for example, are also bright (brightest last): 692 C, 524 C, 243 C, 420 C, 707 C, 1895 C, 7520 C, Cool Gray 3 C, 250 C, 579 C, 671 C, 353 C, 5523 C, 7406 C, 5035 C, 7471 C, 2708 C, 565 C, 5595 C, 7501 C, 473 C, 1555 C, 382 C, 318 C, 2975 C, 516 C, 3375 C, 510 C, 2365 C, 4545 C, 136 C, 344 C, 4685 C, 5455 C, 605 C, 495 C, 217 C, 3245 C, 482 C, 459 C, 571 C, 713 C, 5875 C, 7534 C, 7632 C, 263 C, 489 C, 5175 C, 615 C, 182 C, 141 C, 468 C, 358 C, 538 C, 324 C, 552 C, 503 C, 352 C, 162 C, 304 C, 5807 C, 684 C, 149 C, 580 C, 7548 C, 366 C, 332 C, 719 C, 474 C, 584 C, 7405 C, 123 C, Cool Gray 2 C, 678 C, 531 C, 635 C, 135 C, 1355 C, 699 C, 5245 C, 1225 C, 196 C, 381 C, 517 C, 544 C, 7478 C, 572 C, 610 C, 7500 C, 496 C, 7527 C, 427 C, 129 C, Warm Gray 1 C, 2706 C, 290 C, 351 C, 712 C, 643 C, 614 C, 566 C, 116 C, 389 C, 2707 C, 7486 C, 691 C, 677 C, 365 C, 148 C, 628 C, 460 C, 657 C, 155 C, 7457 C, 109 C, 7403 C, 545 C, Green 0921 C, 128 C, 475 C, 122 C, 604 C, 650 C, 331 C, 7422 C, 585 C, 1345 C, 5315 C, 573 C, 134 C, 7485 C, 396 C, 7604 C, 317 C, Cool Gray 1 C, 3965 C, 706 C, 7402 C, 374 C, 7507 C, 670 C, 7404 C, Yellow 012 C, 609 C, 380 C, 642 C, 121 C, 3955 C, Medium Yellow C, 7443 C, 1215 C, 698 C, 621 C, 115 C, 586 C, 603 C, 108 C, 664 C, 127 C, 461 C, 120 C, 388 C, 7506 C, 373 C, 114 C, 608 C, Yellow C, 587 C, 7541 C, 387 C, 113 C, 7436 C, 379 C, 107 C, 372 C, 3945 C, 649 C, 395 C, 705 C, 607 C, 1205 C, 102 C, 663 C, 394 C, 7401 C, 106 C, 656 C, 602 C, 386 C, 3935 C, 7499 C, 601 C, 101 C, 803 C, 393 C, 100 C, 600 C, Yellow 0131 C.

In addition to black, the following colors according to the Pantone® color system, for example, are also dark (darkest first): Black 6 C, 296 C, 5395 C, 7547 C, 5255 C, 2765 C, 282 C, 275 C, 2768 C, 532 C, 2766 C, 276 C, 274 C, 2755

C, 289 C, Neutral Black C, 273 C, 419 C, 5463 C, 539 C, 2757 C, 2745 C, 2965 C, 2748 C, 281 C, 2758 C, 433 C, 2695 C, 662 C, 2747 C, 2738 C, Black 3 C, 655 C, 303 C, 546 C, 280 C, 2685 C, 2627 C, Reflex Blue C, 426 C, 2756 C, 295 C, 2767 C, Black 4 C, 7463 C, 4975 C, Black C, 533 C, Blue 072 C, 2735 C, 5535 C, 547 C, 627 C, 2617 C, 648 C, 2746 C, 5467 C, 540 C, Black 2 C, 288 C, 7449 C, 294 C, Black 5 C, 440 C, 412 C, 5605 C, Dark Blue C, 2607 C, 669 C, Violet C, 7546 C, 309 C, 534 C, 287 C, Medium Purple C, 2955 C, 560 C, 4625 C, 548 C, 2736 C, 302 C, 7645 C, 567 C, 3035 C, 262 C, 5115 C, 504 C, 654 C, 5185 C, 7421 C, 497 C, 447 C, 439 C, 518 C, 690 C, Black 7 C, 541 C, 7631 C, 2597 C, 7533 C, 661 C, 490 C, 286 C, 7644 C, 476 C, 3308 C, 7652 C, 229 C, 2623 C, 222 C, 432 C, 3435 C, 7694 C, 525 C, 269 C, 261 C, 7448 C, 5265 C, 4695 C, 316 C, 7554 C, 511 C, 553 C, 2613 C, 260 C, 483 C, 5747 C, 519 C, 732 C, 209 C, 7630 C, 7680 C, 7428 C, 3302 C, 7643 C, 188 C, 448 C, 268 C, 1817 C, 293 C, 7650 C, 446 C, 7651 C.

Applied onto the region by means of an injection molding method preferably means that the cover material is melted onto the light-guiding body and, particularly preferably, that the cover material was applied onto the light-guiding body in the molten state.

Preferably, the light guide is arranged on a handle recess of the door actuation module, for example in such a way that the light-exit surface is positioned, wholly or in part, directly behind or in a recess, wherein the recess is present in the handle recess or in a component of the module adjacent to the handle recess.

In a further preferred exemplary embodiment of the present invention, the light-entrance surface is oriented at an angle in relation to the light-exit surface.

As a result of this, the depth of the required installation space is reduced since the light source or an fiber-optic light guide guiding light from the light source to the light-entrance surface does not lie directly behind the light-exit surface, but rather obliquely therebehind or laterally thereto. This is particularly advantageous if the light guide is part of a motor vehicle door, an interior trim of a motor vehicle door or of a door actuator as there is little installation space depth here in contrast to e.g. in the dashboard/car radio.

Preferably, the light-entrance surface includes an angle of between 30° and 150°, particularly preferably of between 60° and 120°, very particularly preferably of 90° with the light-exit surface.

In a further preferred exemplary embodiment of the present invention, the light-guiding body has a reflection surface, which lies opposite or is adjacent to the light-entrance surface and which is oriented at an angle in relation to the light-entrance surface, preferably also in relation to the light-exit surface, and the reflection surface is covered on the rear side by means of the light-opaque cover material.

As a result of this, it is possible to functionally cover the reflection surface on the rear side, for example in such a way that the hue and the brightness of the reflection surface observed from outside/from the front through the light-exit surface corresponds to the hue and the brightness of the components directly surrounding the light-exit surface (e.g. stops, handle tray, trim) such that, when the light source is switched off, the light guide does not exhibit a substantial optical contrast from the surroundings thereof directly visible to the user (e.g. vehicle occupant). Moreover, the brightness of the light source can be set by the selection of the cover material (bright, dark) or it can even be set in a spatially dependent manner (e.g. light-to-dark gradient).

In the case of such a geometry of the light-guiding body, the circumstance that the cover material is applied by means of injection molding moreover plays a great role. This is because the design freedom in relation to the material color/brightness brought about by selecting an appropriate plastic granulate is very large by means of injection molding, while this free selection is not available, for example in the case of cover adhesive tapes. Moreover, cover adhesive tapes do not envelope the area as uniformly (formation of folds) and, under certain circumstances, do not adhere to angled regions continuously, which may lead to optically perceivable color/brightness differences. These problems are avoided in a non-obvious manner by way of injection molding and the selected geometry.

Preferably, the light-exit surface, light-entrance surface and reflection surface form approximately a U, particularly preferably approximately a triangle, preferably a right-angled triangle with the reflection surface as a hypotenuse.

Preferably, the light-entrance surface includes an angle of between 40° and 110°, particularly preferably of between 60° and 90°, very particularly preferably of approximately 70°, with the reflection surface.

In a further preferred exemplary embodiment of the present invention, the light-exit surface is larger than the light-entrance surface.

As a result of this, installation space required for the illumination, which is very tight, particularly in a door inner trim or a door actuation module, can be minimized despite a large exit surface since light can enter in a concentrated manner and then it can be widened to the exit surface.

The light-exit surface is preferably 5-times, particularly preferably 10-times larger than the light-entrance surface. Preferably, the light-exit surface is more elongate than the light-entrance surface, particularly preferably if it is oriented at an angle in relation to the light-entrance surface.

In a further preferred exemplary embodiment of the present invention, a plug-in apparatus, in particular a connection socket, of one of the present light-entrance surfaces is formed for a light source, e.g. an LED, or a light-guiding element, e.g. a glass fiber, by means of the cover material. In a more preferred method, a corresponding plug-in apparatus is formed during the injection molding of the cover material.

As a result of this, a simple connection option to the light source is provided, wherein the connection option can already be configured per se in a light-tight manner. Preferably, the plug-in apparatus is a connection socket, which has a central recess, the preferably collar-shaped edges of which consist of the cover material and at the base of which there is a light-entrance surface of the light-guiding body.

In a further preferred exemplary embodiment of the present invention, one of the present light-entrance surfaces has a concave entrance contour. In a further preferred method, a light-entrance surface is provided with a concave entrance contour.

As a result of this, effective input light coupling from an LED or glass fiber is provided. The concave entrance contour preferably has a circular boundary, wherein the circle diameter substantially corresponds to the diameter of an LED or glass fiber.

Preferably, the light guide is installed in the motor vehicle and an LED or a glass fiber end (or another light-guiding body) is arranged opposite to the concave entrance contour at a distance of at most 20 mm, preferably at most 10 mm, particularly preferably at most 3 mm therefrom or it is preferably in contact with the latter and the diameter of this LED or glass fiber preferably equals the diameter of the concave entrance contour, which is approximately circular.

In a further preferred exemplary embodiment of the present invention, the region of the light-guiding body on which the cover material is applied makes up at least 60% of the surface of the light-guiding body which is not the light-entrance surface and not the light-exit surface.

As a result of this, a very large-area light seal is achieved, and so light only reaches to where it is intended to emerge. Preferably, the region makes up at least 70%, particularly preferably at least 90%, very particularly preferably at least 99% of said surface, i.e., in the latter two cases, the light-guiding body is substantially enveloped by the cover material with the exception of the light-entrance surfaces and light-exit surfaces present.

In a further preferred exemplary embodiment of the present invention, the light guide is a light guide of an interior trim of a motor vehicle, in particular of a door inner trim of a motor vehicle. In a further preferred method, the light guide is installed into an interior trim of a motor vehicle, in particular into a door inner trim of a motor vehicle.

Preferably, the light guide is installed in such a way that the light-exit surfaces are directed to the passenger compartment such that the emerging light radiates mainly into the passenger compartment.

In a further preferred door actuation module according to the invention or a further preferred motor vehicle door, preferably with a door actuation module according to the invention, the light guide is a light guide with an aforementioned reflection surface and the light-opaque cover material which covers the reflection surface on the rear side is bright or matched to the part of the motor vehicle door or of the door actuation module directly surrounding the light guide, preferably the light-exit surface, in terms of hue and/or brightness or it is brighter than said part.

As a result of this, the cover material is functionally used. Very good light forwarding or camouflaging of the light guide is achieved. Both can also be the case simultaneously, for example if the components surrounding the light guide are bright.

Preferably, the cover material covering the reflection surface has the same brightness as the part of the motor vehicle door directly surrounding the light guide, preferably the light-exit surface, or it is matched thereto or it is brighter than the latter. Matched preferably means that the so-called Delta E (Euclidean color difference), preferably in the Lab color space, is less than or equal to 30, preferably less than or equal to 20, particularly preferably less than or equal to 10. In order to obtain almost perfect camouflage, Delta E is preferably less than 2. By way of example, this color difference between two colors represented in the Pantone system can preferably be calculated as follows:

i) initially there is a conversion of the RGB representation of the respective Pantone colors into the XYZ space, preferably by means of:

$X = 0.4124564*R + 0.3575761*G + 0.1804375*B$ $Y = 0.2126729*R + 0.7151522*G + 0.0721750*B$ $Z = 0.019333*R + 0.1191920*G + 0.9503041*B$ ii) thereupon, the Lab values of the respective colors are calculated, preferably by means of:

$L = 116*(Y/100)^{1/3} - 16$ $a = 500*((X/94.811)^{1/3} - (Y/100)^{1/3})$ $b = 200*((Y/100)^{1/3} - (Z/107.304)^{1/3})$ iii) and the comparison of the two colors is carried out by means of Delta E, preferably by means of:

$\text{Delta } E = ((L1-L2)^2 + (a1-a2)^2 + (b1-b2)^2)^{1/2}.$

In a further preferred method of the present invention, the light-guiding body is produced by means of an injection molding method in the same injection molding machine with which the covering is carried out, and so the light guide is produced in a multi-component injection molding method.

As a result of this, a very efficient production of the light guide is provided. The multi-component injection molding method is preferably a two-component injection molding method.

In a further preferred method of the present invention, the light-guiding body or a tool containing a cavity is turned in terms of the position thereof after the light-guiding body was injection molded and before the cover material is injection molded onto the light-guiding body.

As a result of this, the injection process is carried out efficiently. A cavity is preferably understood to mean a recess which has a negative contour of the component to be injection molded.

Preferably, the turning is carried out by means of a rotary plate tool, wherein the light-guiding body is injection molded in a cavity in a rotary plate and the rotary plate is then rotated (e.g. by 180°), the light-guiding body is subsequently introduced into another cavity (which has a contour for the cover material), in which, finally, the cover material is injection molded onto the light-guiding body. Preferably, the rotary plate has at least two cavities and at least two light guides are injection molded in one rotary position of the rotary plate, wherein the light-guiding body is injection molded in the case of the one light guide and the cover material is already injection molded in the case of the other light guide. The rotary plate method leads to an efficient production and it is particularly preferred.

As an alternative to the rotation by means of the rotary plate tool, the rotation is carried out by means of an indexing tool, wherein, after the first injection process (light-guiding body), plug inserts for contours are extended and rotated into another position. The plug inserts are held e.g. on columns.

As an alternative to the rotation by means of the rotary plate tool or the indexing tool, there is a repositioning, preferably with rotation, by means of a repositioning method, in which the light-guiding body is removed from the cavity after the first injection molding (for example by means of an automatic gripper) and inserted into another cavity for the cover material and affixed there, and the cover material is thereupon injection molded onto the light-guiding body.

As an alternative to a rotation, it is possible to apply a core back method, wherein the contour is withdrawn after the first injection process such that a gap arises between the light-guiding body and the contour, into which the cover material is then subsequently injection molded. Depending on the geometry of the light guide, this method is particularly suitable in the case of simple components without undercuts.

The invention is now intended to be elucidated further in an exemplary manner on the basis of drawings. In detail:

Figure 1:
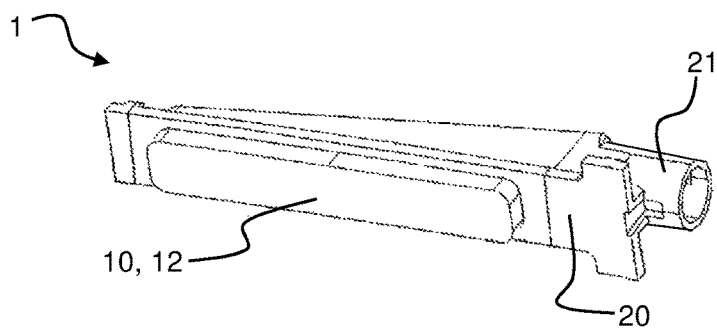
FIG. 1 shows an example of a light guide according to the invention.

FIG. 1 shows an example of a light guide 1 according to the invention for a motor vehicle. It has a light-guiding body 10 made of transparent plastics material, wherein the light-guiding body 10 has a light-entrance surface 11 and a light-exit surface 12. In a region of more than 90% of the surface, which is not the light-entrance surface 11 or light-exit surface 12, the light-guiding body 10 is covered by means of a substantially light-opaque cover material 20, which is applied onto the region by means of an injection molding method. Furthermore, this is a light guide 1 of a door inner trim of a motor vehicle. The areas around the light-exit surface 12 are likewise not molded here—they are subsequently covered by a different housing part of the door inner trim.

The production contains the following steps:
producing the light-guiding body 10 from transparent plastics material, with the light-entrance surface 11 and the light-exit surface 12 being shaped in the process;
covering the region of the light-guiding body 10 by means of the substantially opaque cover material 20, wherein the covering is carried out by means of an injection molding method.

Moreover, the following optional aspects are elucidated: the light-entrance surface 11 is oriented at an angle, in this case at approximately 90°, in relation to the light-exit surface 12; the light-guiding body 10 has a reflection surface 13, which is adjacent to the light-entrance surface 11 and oriented at an angle of approximately 70° in relation to the light-entrance surface 11 and oriented at an angle of approximately 90° in relation to the light-exit surface 12; on the rear side, the reflection surface 13 is covered by means of the light-opaque cover material 20; the light-exit surface 12, the light-entrance surface 11 and the reflection surface 13 approximately form, at least in the imagined extensions thereof, a right-angled triangle with the reflection surface 13 as a hypotenuse; the light-exit surface 12 is more than 10-times larger than the light-entrance surface 11; the light-exit surface 12 is more elongate than the light-entrance surface 11.

Figure 2:
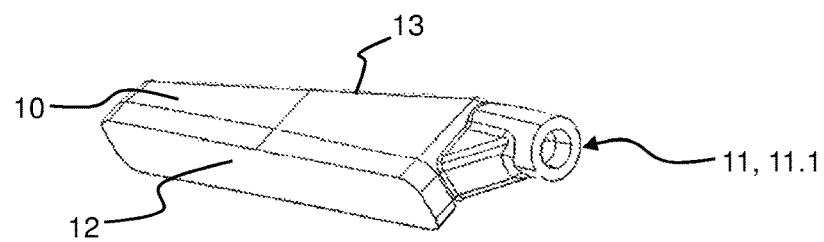
FIG. 2 shows the light-guiding body of the light guide from FIG. 1.

FIG. 2 shows the light-guiding body 10 of the light guide 1 from FIG. 1. In this example, the light-guiding body 10 is produced by means of an injection molding method in the same injection molding machine with which the covering is carried out. Therefore, the light guide 1 is produced in a two-component injection molding method. After it was injection molded and before the cover material 20 is injection molded onto the light-guiding body 10, the light-guiding body 10 is rotated in terms of the position thereof by means of a rotary plate.

Figure 3:
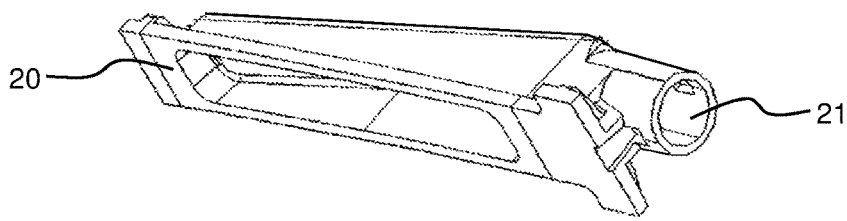
FIG. 3 shows a separate view of the cover material of the light guide from FIG. 1 molded around the light-guiding body.

FIG. 3 shows a separate view of the injection-molded cover material 20 of the light guide 1 from FIG. 1. A plug-in apparatus 21, in this case a connection socket, of the light-entrance surface 11 for an LED is formed by means of the cover material 20.

Figure 4:
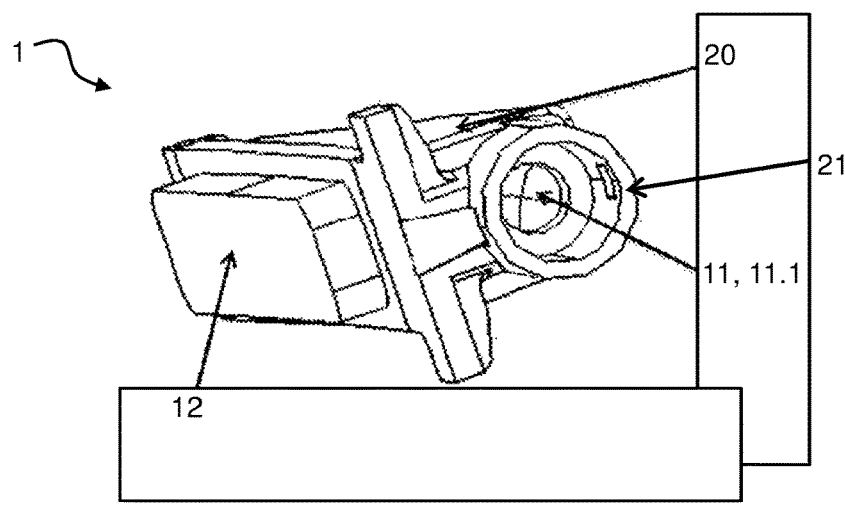
FIG. 4 shows a view of the light guide from FIG. 1, slightly rotated in relation to FIG. 1, in which, in particular, the entrance contour can clearly be seen.

FIG. 4 shows a view of the light guide 1 from FIG. 1, slightly rotated in relation to FIG. 1, in which, in particular, the entrance contour 11.1 of the light-entrance surface 11 can clearly be seen.

LIST OF REFERENCE SIGNS

1 Light guide
10 Light-guiding body
11.1 Entrance contour
11 Light-entrance surface
12 Light-exit surface
13 Reflection surface
20 Cover material
21 Plug-in apparatus

The invention claimed is:

1. A light guide (1) for a motor vehicle, wherein the light guide (1) has a light-guiding body (10) made of transparent plastics material, wherein the light-guiding body (10) has at least one light-entrance surface (11) and at least one light-exit surface (12) and wherein the light-guiding body (10) is covered in a region by means of a substantially light-opaque cover material (20), wherein the substantially light-opaque cover material (20) is a molded cover material applied onto the region by means of an injection molding method;
wherein the light-entrance surface (11) is oriented at an angle in relation to the light-exit surface (12);
wherein the light-guiding body (10) has a reflection surface (13), which lies opposite or is adjacent to the light-entrance surface (11) and which is oriented at an angle in relation to both the light-entrance surface (11) and the light-exit surface (12), and wherein the reflection surface (13) is covered on the rear side by the molded cover material (20);
wherein the light entrance surface has a concave entrance contour;
wherein a portion of the molded cover material (20) is provided around the light entrance surface (11) with a collar-shape to form a plug-in connection socket (21) that is configured for receiving a light source or a light-guiding element and holding the light source or the light-guiding element adjacent the light-entrance surface (11).

2. The light guide (1) as claimed in claim 1, wherein the light-exit surface (12) is larger than the light-entrance surface (11).

3. The light guide (1) as claimed in claim 1, wherein the region of the light-guiding body (10) on which the cover material (20) is applied makes up at least 60% of the surface of the light-guiding body (10) which is not the light-entrance surface (11) and not the light-exit surface (12).

4. A motor vehicle door with a door inner trim, wherein the door inner trim has a light guide (1) as claimed in claim 1.

5. A door actuation module for a motor vehicle, wherein the door actuation module has a light guide (1) as claimed in claim 1.

6. The door actuation module as claimed in claim 5 wherein the molded cover material (20) which covers the reflection surface (13) on the rear side is bright or it is matched to the part of the motor vehicle door or of the door actuation module directly surrounding the light guide (1) in terms of hue and/or brightness or it is brighter than said part.

7. A vehicle door inner trim including the light guide of claim 1.

* * * * *